United States Patent
Song

(10) Patent No.: US 12,106,171 B2
(45) Date of Patent: Oct. 1, 2024

(54) METHOD AND APPARATUS FOR IMPROVING READING AND WRITING SPEED OF CONTACTLESS CARD AND TERMINAL DEVICE

(71) Applicant: SHENZHEN ZOLON TECHNOLOGY CO., LTD., Shenzhen (CN)

(72) Inventor: Kunxian Song, Shenzhen (CN)

(73) Assignee: SHENZHEN ZOLON TECHNOLOGY CO., LTD., Shenzhen (CN)

(*) Notice: Subject to any disclaimer, the term of this patent is extended or adjusted under 35 U.S.C. 154(b) by 591 days.

(21) Appl. No.: 17/769,891

(22) PCT Filed: Nov. 7, 2019

(86) PCT No.: PCT/CN2019/116304
§ 371 (c)(1),
(2) Date: Apr. 18, 2022

(87) PCT Pub. No.: WO2020/155734
PCT Pub. Date: Aug. 6, 2020

(65) Prior Publication Data
US 2022/0398391 A1   Dec. 15, 2022

(30) Foreign Application Priority Data

Jan. 28, 2019 (CN) .......................... 201910080065.4

(51) Int. Cl.
*G06Q 20/30* (2012.01)
*G06K 7/10* (2006.01)
(Continued)

(52) U.S. Cl.
CPC ....... *G06K 7/10366* (2013.01); *G06Q 20/208* (2013.01)

(58) Field of Classification Search
CPC ........... G06K 7/10366; G06K 7/10297; G06K 7/10198; G06Q 20/208; G06Q 20/204; G06Q 20/352
(Continued)

(56) References Cited

U.S. PATENT DOCUMENTS

2005/0203856 A1* 9/2005 Russell .............. G06Q 20/3674
705/67
2018/0206111 A1   7/2018 Heath et al.

FOREIGN PATENT DOCUMENTS

CN   103870868 A  *  6/2014
CN   104935090 A     9/2015
(Continued)

OTHER PUBLICATIONS

International Search Report issued on Jan. 31, 2020 in corresponding International application No. PCT/CN2019/116304; 4 pages.

*Primary Examiner* — Garcia Ade
(74) *Attorney, Agent, or Firm* — Maier & Maier, PLLC

(57) ABSTRACT

A method and an apparatus for improving a reading and writing speed of a contactless card, a terminal device, and a computer-readable storage medium. The method includes: running a driver of a POS terminal; obtaining a communication signal between the driver and an interface chip, in which data to be read and written of the contactless card are obtained by the interface chip according to the communication signal, and wherein data interaction are performed between a card reader on which the interface chip located and the contactless card; obtaining a timing waveform diagram of the driver according to the communication signal; obtaining a running time of the driver according to the timing waveform diagram; modifying the driver to shorten the running time of the driver according to the running time and a preset driver modification rule.

16 Claims, 2 Drawing Sheets

(51) Int. Cl.
*G06Q 20/20* (2012.01)
*G06Q 20/28* (2012.01)

(58) Field of Classification Search
USPC .......................................................... 705/23
See application file for complete search history.

(56) References Cited

FOREIGN PATENT DOCUMENTS

| | | | |
|---|---|---|---|
| CN | 105447413 | A | 3/2016 |
| CN | 106855812 | A | 6/2017 |
| CN | 107274608 | A | 10/2017 |
| CN | 108183958 | A | 6/2018 |
| CN | 109117684 | A | 1/2019 |
| EP | 2763076 | A1 | 8/2014 |

* cited by examiner

METHOD AND APPARATUS FOR IMPROVING READING AND WRITING SPEED OF CONTACTLESS CARD AND TERMINAL DEVICE

CROSS-REFERENCE TO RELATED APPLICATIONS

This application claims priority to Chinese Patent Application No. 201910080065.4 filed on Jan. 28, 2019, the contents of which are incorporated herein by reference in their entirety.

TECHNICAL FIELD

The present application relates to the technical field of communication, and in particular, relates to a method and an apparatus for improving the reading and writing speed of a contactless card, a terminal device, and a computer-readable storage medium.

BACKGROUND

Nowadays, the use of contactless card is more and more widely, and the requirements for the transaction speed of contactless card are also higher and higher.

PayPass (financial contactless IC card protocol specification formulated by Visa Card International), PayWare (financial contactless IC card protocol specification formulated by MasterCard International) and UnionPay certification all have requirements and restrictions on the transaction speed of contactless cards. When running the authentication test case of the transaction speed of the contactless card, the processing time of the POS terminal part of the whole transaction process is within 100 milliseconds, but from the actual transaction speed authentication of the contactless card, especially the transaction speed of the contactless card authenticated in a non-real-time operating system platform, such as Linux and android, the transaction time after special processing is still greater than 100 milliseconds and can't meet certification requirements.

SUMMARY

In view of this, the embodiments of the present application provide a method and an apparatus for improving the reading and writing speed of a contactless card, a terminal device, and a computer-readable storage medium so as to solve the problem that when performing authentication of transaction speed of a contactless card on a non-real-time operating system platform in the prior art, the transaction speed of the contactless card is relatively slow and does not meet the authentication requirements.

A first aspect of the embodiments of the present application provides a method for improving the reading and writing speed of a contactless card. The method includes: running a driver of a POS terminal; obtaining a communication signal between the driver and an interface chip, the interface chip obtaining a data to be read and written by the contactless card according to the communication signal, a card reader on which the interface chip located and the contactless card performing an interaction of the data; obtaining a timing waveform diagram of the driver according to the communication signal; obtaining a running time of the driver according to the timing waveform diagram; modifying the driver to shorten the running time of the driver according to the running time and a preset driver modification rule.

A second aspect of the embodiments of the present application provides an apparatus for improving reading and writing speed of a contactless card. The device includes: a driver running unit, configured to run the driver of a POS terminal; a communication signal obtaining unit, configured to obtain the communication signal between the driver and the interface chip wherein the interface chip obtains the data to be read and written by the contactless card according to the communication signal, a card reader on which the interface chip located and the contactless card performs an interaction of the data; a timing waveform diagram obtaining unit, configured to obtain a timing waveform diagram of the driver according to the communication signal; a running time obtaining unit, configured to obtain a running time of the driver according to the timing waveform diagram; a driver modifying unit, configured to modify the driver to shorten the running time of the driver according to the running time and the preset driver modification rule.

A third aspect of the embodiments of the present application provides a terminal device which includes a memory, a processor and a computer program stored in the memory and running on the processor. The processor executes the computer program to realize steps of the method for improving the reading and writing speed of a contactless card.

A fourth aspect of the embodiments of the present application provides a computer-readable storage medium storing a computer program. The processor executes the computer program to realize steps of the method for improving the reading and writing speed of a contactless card.

Compared with the existing technology, the embodiment of the present application has the following beneficial effects: a driver of a POS terminal is run; a communication signal between the driver and an interface chip is obtained, data to be read and written by the contactless card is obtained by the interface chip according to the communication signal, data interaction performs between a card reader on which the interface chip located and the contactless card; a timing waveform diagram of the driver is obtained according to the communication signal; a running time of the driver is obtained according to the timing waveform diagram; the driver is modified to shorten the running time of the driver according to the running time and a preset driver modification rule. Since the running time of the driver can be obtained according to the timing waveform diagram, the driver can be modified according to the running time and the preset driver modification rule to shorten the running time of the driver and thereby improving the speed of the interface chip to read and write the contactless card. The speed of reading and writing the contactless card by the driver of the POS terminal is improved, so that when the transaction speed of the contactless card is authenticated under the non-real-time operating system platform, the transaction speed of the contactless card can meet the authentication requirements.

BRIEF DESCRIPTION OF THE DRAWINGS

In order to explain the technical solutions in the embodiments of the present application more clearly, the following briefly introduces the accompanying drawings that need to be used in the description of the embodiments or the prior art. Obviously, the drawings in the following description are only for some embodiments of the present application. For those of ordinary skill in the art, other drawings can also be obtained according to these drawings without any creative effort.

FIG. 1 is a schematic flowchart of a method for improving the reading and writing speed of a contactless card according to an embodiment of the present application.

DETAILED DESCRIPTION OF THE EMBODIMENTS

Figure 1:
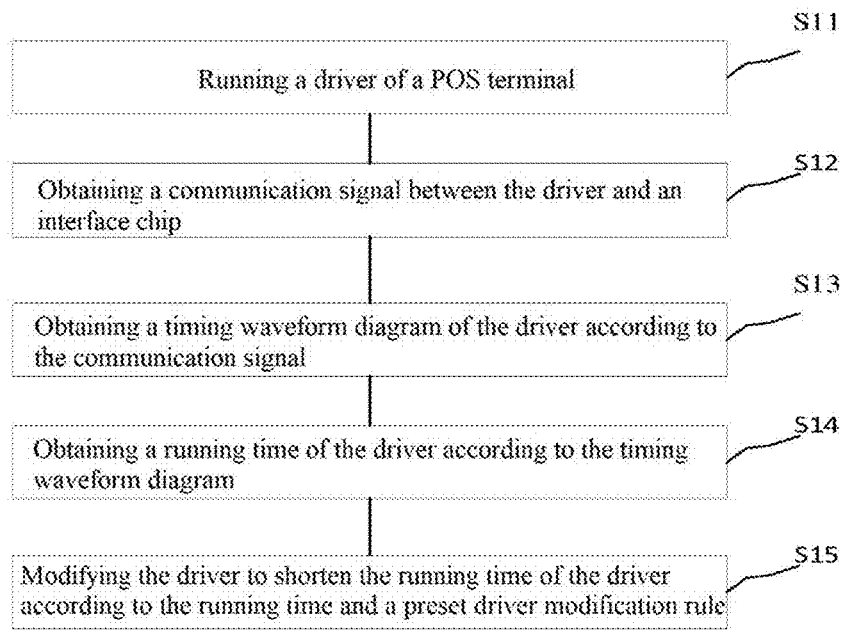

In the following description, for the purpose of illustration rather than limitation, specific details such as specific system structures and technologies are set forth in order to provide a thorough understanding of the embodiments of the present application. However, it will be apparent to those skilled in the art that the present application may be practiced in other embodiments without these specific details. In other instances, detailed descriptions of well-known systems, devices, circuits, and methods are omitted so as not to obscure the description of the present application with unnecessary detail.

In order to illustrate the technical solutions of the present application, the following specific embodiments are used for description. It is to be understood that, when used in this specification and the appended claims, the term "comprising" indicates the presence of the described feature, whole, step, operation, element and/or component, but does not exclude one or more other features, whole, step, operation, element, component and/or the presence or addition of a collection thereof.

It should also be understood that the terminology used in the specification of the application herein is for the purpose of describing particular embodiments only and is not intended to limit the application. As used in this specification and the appended claims, the singular forms "a," "an," and "the" are intended to include the plurality unless the context clearly dictates otherwise.

It should also be further understood that, as used in this specification and the appended claims, the term "and/or" refers to and including any and all possible combinations of one or more of the associated listed items.

As used in this specification and the appended claims, the term "if" may be contextually interpreted as "when" or "once" or "in response to determining" or "in response to detecting". Similarly, the phrases "if it is determined" or "if the [described condition or event] is detected" may be interpreted, depending on the context, to mean "once it is determined" or "in response to the determination" or "once the [described condition or event] is detected." or "in response to detection of the [described condition or event]".

In specific implementations, the terminals described in the embodiments of the present application include, but are not limited to, other portable devices such as mobile phones, laptop computers, or tablet computers with touch-sensitive surfaces (eg, touch screen displays and/or touch pads). It should also be understood that, in some embodiments, the above-described devices are not portable communication devices, but rather desktop computers with touch-sensitive surfaces (eg, touch screen displays and/or touch pads).

In the following discussion, a terminal including a display and a touch-sensitive surface is described. It should be understood, however, that the terminal may include one or more other physical user interface devices such as a physical keyboard, mouse and/or joystick.

The terminal supports various application program such as one or more of the following: drawing application program, presentation application program, word processing application program, website creation application program, disc burning application program, spreadsheet application program, gaming application program, telephone application program, video conferencing application program, email application program, instant messaging application program, exercise support application program, photo management application program, digital camera application program, digital video camera application program, web browsing application program, digital music player application program and/or a digital video player application.

Various application program that may be executed on the terminal may use at least one common physical user interface device, such as a touch sensitive surface. One or more functions of the touch-sensitive surface and corresponding information displayed on the terminal may be adjusted and/or changed between application program and/or within respective application program. In this way, the common physical architecture of the terminal (eg, touch-sensitive surface) can support various application program with a user interface that is intuitive and transparent to the user.

Embodiment 1

FIG. 1 shows a schematic flowchart of a method for improving the reading and writing speed of a contactless card provided by an embodiment of the present application, and the details are as follows:

Step S11, running a driver of a POS terminal.

Specifically, when the running start instruction of the driver of the POS terminal is received, the driver of the POS terminal is run.

POS (Point Of Sales, point of sale information management system) terminal is a terminal reader equipped with barcode or OCR (Optical Character Recognition) code technology terminal reader, with cash or barter limit cashier function. The POS terminal's main task is to provide data services and management functions for commodity and media transactions, as well as non-cash settlement.

Optionally, the step S11 includes running the contactless test stub program of the POS terminal, and the contactless test stub program calls the driver, that is sequentially calling the card search interface function code and the anti-collision interface function code, activation interface function code, APDU command interface function code. The APDU command is the command sent by the application protocol data unit (APDU) to the contactless card, so as to realize a complete contactless card read and write operation process, the complete contactless card read and write operation procedures are as follows: card search, anti-collision, card activation, APDU command interaction, and completion of card removal interface.

The function code of the card search interface includes: an open carrier code, a first contactless card wake-up code, a first contactless card suspend code, a second contactless card wake-up code; the anti-collision interface function code includes: a first contactless card re-awakening code, an anti-collision command sending code, an user identity certification confirmation code; the activation interface function code includes: a regression analysis of time series (RATS) command sending code, RATS response receiving code; the APDU command interface function code includes: a main file search command sending code, a main file search command response code.

Optionally, the function code of the card searching interface includes: a wrong interruption code fragment, and the wrong interruption code includes: a wrong interruption enable code fragment.

Optionally, the card search interface function code further includes a data sending setting code.

In step S12, the communication signal between the driver and the interface chip is obtained, the interface chip obtains the data to be read and written by the contactless card according to the communication signal, and the card reader on which the interface chip located communicates and the contactless card perform an interaction of the data.

Optionally, the interface chip is on a card reader, and the card reader is a unit in the POS terminal, or the card reader is a unit externally connected to the POS terminal, which is not limited here.

Optionally, when the POS terminal runs the driver, the communication signal between the driver of the POS terminal and the interface chip is obtained by using a loop test method through the hardware resource port line connected to the logic analyzer device and the interface chip, the logic analyzer device may be a high sampling frequency multi-channel logic analyzer, which is not limited here. The hardware resource port lines include: Serial Peripheral Interface (SPI) signal lines, interrupt signal lines, interface function running time measurement signal lines.

The communication signal between the driver of the POS terminal and the interface chip includes: a serial peripheral interface (Serial Peripheral Interface, SPI) signal, an interrupt signal, and an interface function running time measurement signal. The SPI signals include: master output/slave input (MOSI) signal, master input/slave output (MISO) signal, clock (CLK) signal, slave device enable (Chip Select, CS) signal.

Since the SPI signal includes the MOSI signal, the MISO signal, the CLK signal, and the CS signal, the communication between the driver and the contactless interface chip through the card reader can be obtained through the SPI signal.

In Step S13, obtaining the timing waveform diagram of the driver according to the communication signal.

Optionally, the step S13 includes: obtaining the corresponding timing waveform diagram of the card search interface function code, the anti-collision interface function code, the activation interface function code, and the APDU command interface function code. according to the communication signal, the timing waveform diagram corresponds to the complete contactless card read and write operation process.

Optionally, the step S13 includes: determining whether the communication signal is equal to or greater than a preset level threshold, and if the communication signal is equal to or greater than the preset threshold level, the communication signal is set to be a high-level communication signal; if the communication signal is less than a preset threshold level, the communication signal is set to a low-level communication signal. According to the high-level communication signal, the low-level communication signal, the interface function running time measurement signal, and the acquisition sequence of the communication signal, the timing waveform diagram of the driver is obtained. The timing waveform diagram includes any combination of one or more of the following timing waveform diagrams: a MOSI sub-timing waveform diagram, a MISO sub-timing waveform diagram, a CLK sub-timing waveform diagram, a CS sub-timing waveform diagram, an interrupt timing waveform diagram, an Application Programming Interface (API) envelope waveform.

Optionally, after the step S13 is performed, the timing waveform diagram is displayed.

Figure 2:
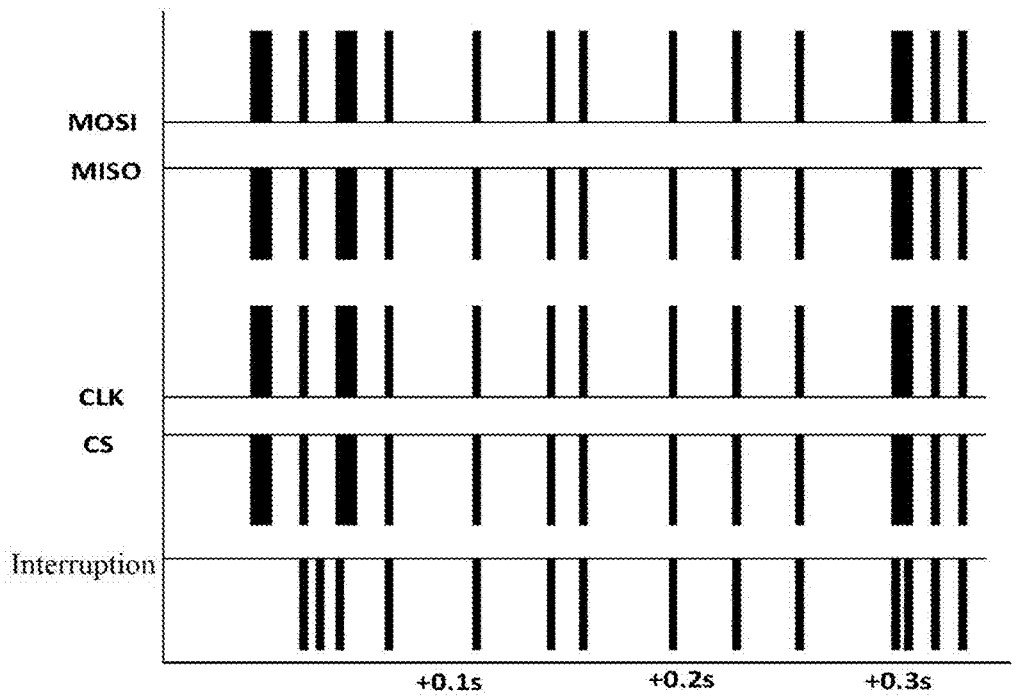
FIG. 2 is a schematic diagram of a timing waveform diagram provided by an embodiment of the present application.

For example, displaying the timing waveform diagram shown in FIG. 2.

In Step S14, obtaining the running time of the driver according to the timing waveform diagram.

Optionally, the step S14 includes: obtaining the overall running time according to the timing waveform diagram; removing the fixed necessary time from the overall running time to obtain the running time of the driver, where the fixed necessary time includes: a carrier turn-on time, a card response delay time.

For example, obtaining the overall running time according to the timing waveform diagram, the overall running time includes the time corresponding to all the communication signals obtained after the card search interface function code, the anti-collision interface function code, the activation interface function code, and the APDU command interface function code run over one time, removing the fixed necessary time from the overall running time to obtain the running time of the driver. The fixed necessary time includes: a carrier turn-on time, a card response delay time, a POS terminal data sending time.

In Step S15, modifying the driver to shorten the running time of the driver according to the timing waveform diagram and the preset driver modification rule.

Optionally, the step S15 includes:

A1. Determining the target code fragment according to the running time, the target code fragment is the code fragment whose running time in the driver is equal to or greater than the preset code fragment running time threshold.

A2. Modifying the target code fragment to shorten the running time of the driver according to the preset driver modification rule.

Optionally, if the target code fragment includes the wrong interruption code fragment, and the wrong interruption code fragment includes the wrong interruption enable code fragment, the step A2 includes: According to the wrong interruption code fragment and the preset driver modification rule, the wrong interruption enable code fragment is adjusted to be after the data transmission setting code fragment, the preset driver modification rule includes if the target code fragment includes the wrong interruption code fragment, and the wrong interruption code fragment includes the wrong interruption enable code fragment, then the wrong interruption enable code fragment is adjusted to be after the data transmission setting code fragment.

For example, if the target code fragment includes the card search interface function code, and the card search interface function code includes the wrong interruption code fragment, the wrong interruption code fragment in the card search interface function code is determined according to the running time, and the wrong interruption code fragment includes wrong interruption enable code fragment; determining whether the card search interface function code includes data transmission setting code fragment, if the card search interface function code includes data transmission setting code fragment, determining the wrong interruption enable code whether the fragment is before the data transmission setting code fragment, if the wrong interruption enable code fragment is before the data transmission setting code fragment, the wrong interruption enable code fragment is adjusted to be after the data transmission setting code fragment.

Since the wrong interruption enable code fragment is adjusted to after the data transmission setting code fragment, the operation of the data transmission setting code fragment can be prevented from being interrupted by wrong interruption, thereby avoiding the time delay for the interface chip to send data to the contactless card, and improving the writing speed of the contactless card.

Optionally, the A1 includes: counting a first time, a second time, a third time, a fourth time, a fifth time according to the running time, the first time is the time used to call the driver, the second time is the frame delay time, the third time is the sum of the time to configure the interface chip and the time to write the data to be sent to the contactless card to the interface chip cache, the fourth time is the time used to complete sending the data to the contactless card, and the fifth time is the time used to receive the data responded by the contactless card; determining the target code fragment according to the first time, the second time, the third time, the fourth time, the fifth time and the preset code fragment running time threshold, so the preset code fragment running time thresholds include: a preset first time threshold, a preset second time threshold, a preset third time threshold, a preset fourth time threshold, and a preset fifth time threshold.

Specifically, according to the timing waveform diagram and the running time, summing up a time used to call the driver in all interface function codes to calculate the first time; summing up the frame delay time in all interface function codes to calculate the second time; summing up the time for configuring the interface chip in all the interface function codes and the time for writing the data to be sent to the contactless card in the interface chip cache to calculate the third time; summing up the time used to complete the sending data to the contactless card to calculate the fourth time, and summing up the time spent in receiving the data responded by the contactless card in all interface function codes to calculate the fifth time. Compare the first time with the preset first time threshold, and if the first time is greater than or equal to the preset first time threshold, determining the target code fragment includes the code fragment corresponding to the first time. By the way, processing the second time, the third time, the fourth time, the fifth time. The preset code fragment running time threshold can be set independently by the user.

Optionally, if the target code fragment includes the code fragment corresponding to the third time or/and the code fragment corresponding to the fifth time, the A2 includes: determining whether the FIFO data stream read mode is continuous data stream read mode. The preset driver modification rule includes that if the FIFO data stream read mode is not the continuous data stream read mode, modifying the code fragment for setting the FIFO data stream read mode, so as to set the FIFO data stream read mode to the continuous data stream read mode; if the FIFO data stream read mode is not continuous data stream read mode, modifying the code fragment for setting the FIFO data stream read mode, so as to set the FIFO data stream read mode to the continuous data stream read mode.

For example, according to the statistics of the running time, the third time is 5670 microseconds, and the fifth time is 7622 microseconds. Assuming that the preset third time threshold are 3000 microseconds, and the preset fifth time threshold are 7000 microseconds, the target code fragment including the code fragment corresponding to the third time or/and the code fragment corresponding to the fifth time, assuming that the first-in first-out queue (First Input First Output, FIFO) data stream mode is not continuous data stream read mode, then modifying set code fragment of the FIFO data stream read mode to realize that the FIFO data stream read mode is set to the continuous data stream read mode.

Optionally, if the target code fragment includes the code fragment corresponding to the second time, the A2 includes: determining whether the parameter configuration time of the contactless card is equal to or greater than the frame delay standard time, and the preset driver modification rule includes: if the target code fragment includes the code fragment corresponding to the second time, and the parameter configuration time of the contactless card is equal to or greater than the frame delay standard time, modifying the code fragment corresponding to the second time to remove the frame delay time; if the parameter configuration time of the contactless card is equal to or greater than the frame delay standard time, modifying the code fragment corresponding to the second time to remove the frame delay time.

For example, the target code fragment includes the code fragment corresponding to the second time, the second time is 4635 microseconds, the frame delay standard time is set to be 500.32 microseconds, and 500.32 microseconds meet the requirements for the frame delay time in the EMV standard, so The EMV standard mentioned above is a technical standard for the transfer of bank cards from magnetic stripe cards to smart IC cards jointly initiated by Europay, MasterCard and Visa. Assuming that the parameter configuration time of the contactless card is 786 microseconds, modifying the code fragment corresponding to the second time to remove the frame delay time.

Optionally, if the parameter configuration time of the contactless card is less than the frame delay standard time, the difference between the frame delay standard time and the parameter configuration time of the contactless card is calculated, and the second time is updated to the difference.

Optionally, after the step S15 is performed, the method includes: verifying whether the optimized running time of the driver complies with the preset running time standard of the driver.

Specifically, the preset driver running time standard is obtained, and it is verified whether the optimized driver's running time meets the preset driver running time standard.

For example, the obtained preset driver running time standard is that the driver's running time is less than or equal to 100 milliseconds. Assuming that the optimized driver's running time is 23 milliseconds, the optimized driver's running time meets the preset driver running time standard.

In the embodiment of the present application, the communication signal between the driver and the interface chip is obtained by running the driver of the POS terminal, and the interface chip obtains the data to be read and written by the contactless card according to the communication signal, and the interface chip on which the card reader located interacting with the contactless card, and obtaining the timing waveform diagram of the driver according to the communication signal, obtains the running time of the driver according to the timing waveform diagram, and obtaining the running time according to the running time and preset driver modification rule, modifying the driver to shorten the running time of the driver. Since the running time of the driver can be obtained according to the timing waveform diagram, the driver can be modified according to the running time and the preset driver modification rule to shorten the running time of the driver and improve the speed of the interface chip to read and write the contactless card. The speed of reading and writing the contactless card by the driver of the POS terminal is improved, so that when the transaction speed of the contactless card is authenticated under the non-real-time operating system platform, the transaction speed of the contactless card can meet the authentication requirements.

Embodiment 2

Figure 3:
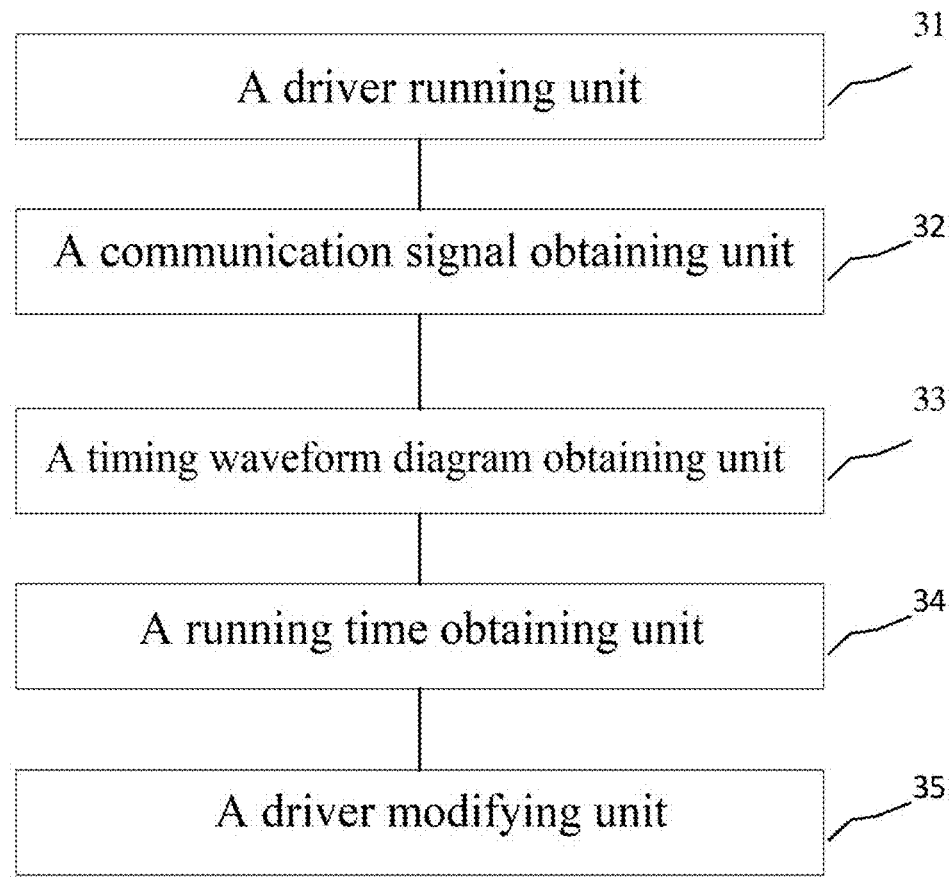
FIG. 3 is a schematic diagram of an apparatus for improving reading and writing speed of a contactless card provided by an embodiment of the present application.

Corresponding to the first embodiment above, FIG. 3 shows a schematic diagram of a device for improving reading and writing speed of a contactless card provided by the embodiment of the present application. For the convenience of description, only the relevant embodiments of the present application are shown. part.

The device for improving reading and writing speed of a contactless card includes:

a driver running unit 31, a communication signal obtaining unit 32, a timing waveform diagram obtaining unit 33, a running time obtaining unit 34, a driver modifying unit 35.

The driver running unit 31, configured to run the driver of the POS terminal.

The driver running unit 31 is specifically used to run the driver of the POS terminal when it receives the start command of the driver of the POS terminal.

Optionally, the driver running unit 31 is used to: run the contactless test stub program of POS terminal, and the contactless test stub program calls the driver, namely by calling the card search interface function code, the anti-collision interface function code successively, activation interface function code, APDU command interface function code. The APDU command is the command sent by the application protocol data unit (Application Protocol Data Unit, APDU) to the contactless card, so as to realize a complete contactless card read and write operation process. The complete contactless card read and write operation procedures are as follows: card search, anti-collision, card activation, APDU command interaction, and completion of card removal interface.

The card search interface function code includes: an open carrier code, a first contactless card wake-up code, a first contactless card suspend code, a second contactless card wake-up code. The anti-collision interface function code includes: a first contactless card re-awakening code, an anti-collision command sending code, an user identity certification confirmation code. The activation interface function code includes: a regression analysis of time series (RATS) command sending code, a RATS response receiving code. The APDU command interface function code includes: the master file command finds the command sending code, and the master file command finds the command response code.

Optionally, the card search interface function code includes: a wrong interruption code fragment, and the wrong interruption code includes: a wrong interruption enable code fragment.

Optionally, the card searching interface function code further includes a data sending setting code.

The communication signal obtaining unit 32 is used to obtain the communication signal between the driver and the interface chip, the interface chip obtains the data to be read and written by the contactless card according to the communication signal, the card reader where the interface chip is located and the contactless card perform an interaction of the data.

Optionally, the interface chip is on a card reader, and the card reader is a unit in the POS terminal, or the card reader is a unit externally connected to the POS terminal, which is not limited here.

Optionally, the communication signal obtaining unit 32 is used for: when the described POS terminal runs the described driver, the hardware resource port line that is connected with the interface chip by the logic analyzer device adopts the loop test mode to obtain the driver and the interface chip of the described POS terminal. The communication signal between interface chips, the logic analyzer device may be a high sampling frequency multi-channel logic analyzer, which is not limited here, and the hardware resource port line includes: a Serial Peripheral Interface (SPI) Signal line, an interrupt signal line, an interface function running time measure signal line.

The timing waveform diagram obtaining unit 33 is used for obtaining the timing waveform diagram of the driver according to the communication signal.

Optionally, the timing waveform diagram obtaining unit 33 is used to: obtain the corresponding interface function codes of the card search interface, the anti-collision interface function codes, the activation interface function codes, and the timing waveform diagram corresponding to APDU command interface function codes, the timing waveform diagram corresponds to a complete contactless card read and write operation process.

Optionally, the timing waveform diagram obtaining unit 33 is specifically used for: determining whether the communication signal is equal to or greater than the preset level threshold, if the communication signal is equal to or greater than the preset level threshold, then the communication signal is set as a high-level communication signal; if the communication signal is less than a preset level threshold value, the communication signal is set as a low-level communication signal. According to the high-level communication signal, the low-level communication signal, the interface function running time measurement signal, and the acquisition sequence of the communication signal, the timing waveform diagram of the driver is obtained. The timing waveform diagram includes any combination of one or more of the following timing waveform diagrams: MOSI sub-timing waveform diagram, MISO sub-timing waveform diagram, CLK sub-timing waveform diagram, CS sub-timing waveform diagram, interrupt timing waveform diagram, application program Application Programming Interface (API) envelope waveform.

Optionally, the device for improving reading and writing speed of a contactless card includes a timing waveform diagram display unit, and the timing waveform diagram display unit is used for executing the obtaining of the driver according to the communication signal in the timing waveform diagram obtaining unit 33 after the timing waveform diagram, display the timing waveform diagram.

The running time obtaining unit 34 is used to obtain the running time of the driver according to the timing waveform diagram.

Optionally, the execution time obtaining unit 34 is specifically configured to: obtain the overall running time according to the timing waveform diagram; remove the fixed necessary time from the overall running time to obtain the running time of the driver, and the fixed necessary time includes: a carrier turn-on time, a card response delay time.

The driver modifying unit 35 is configured to modify the driver to shorten the running time of the driver according to the running time and the preset driver modification rule.

Optionally, the driver modifying unit 35 includes: a target code fragment determination module and a target code fragment modification module.

The target code fragment determining module is used for: determining the target code fragment according to the running time, where the target code fragment is the code fragment whose running time is equal to or greater than the preset code fragment running time threshold in the driver.

The target code fragment modification module is used for: modifying the target code fragment according to the preset driver modification rule to shorten the running time of the driver.

Optionally, if the target code fragment includes the wrong interruption code fragment, and the wrong interruption code fragment includes the wrong interruption enable code fragment, and the wrong interruption code fragment includes the wrong interruption enable code fragment, the target code fragment modification module is specifically used for: according to the wrong interruption code fragment and the preset driver modification rule, after the wrong interruption enable code fragment is adjusted to be after the data transmission setting code fragment, the preset driver modification rule includes if there is a wrong interruption code fragment, and the wrong interruption code fragment includes the wrong interruption enable code fragment, then the wrong interruption enable code fragment is adjusted to be after the data transmission setting code fragment.

Since the target code fragment modification module adjusts the wrong interruption enable code fragment to be after the data transmission setting code fragment, thereby avoiding a false interruption to interrupt the running of the data transmission setting code fragment, thereby avoiding the time delay for the interface chip to send data to the contactless card, which improves the speed of writing contactless cards.

Optionally, the target code fragment determination module is used to: count a first time, a second time, a third time, a fourth time, a fifth time according to the running time, the first time is the time used to call the driver, and the second time is frame delay time, third time is the sum of the time to configure the interface chip and the time to write the data to be sent to the contactless card to the interface chip cache, and fourth time is the time used to complete sending the data to the contactless card. time, the fifth time is the time used to receive the data responded by the contactless card; according to the first time, the second time, the third time, the fourth time, the fifth time and the preset code fragment running time threshold, determine target code fragment, the preset code fragment running time thresholds include: a preset first time threshold, a preset second time threshold, a preset third time threshold, a preset fourth time threshold, and a preset fifth time threshold.

Optionally, if the target code fragment includes the code fragment corresponding to the third time or/and the code fragment corresponding to the fifth time, the target code fragment modification module is specifically used to: determine whether the FIFO data stream read mode is continuous data stream read mode, and the preset driver modification rule includes that if the FIFO data stream read mode is not continuous data stream read mode, modifying the code fragment for setting the FIFO data stream read mode to implement the read FIFO data stream The stream mode is set to the continuous data stream read mode; if the FIFO data stream read mode is not the continuous data stream read mode, modifying the setting code fragment of the FIFO data stream read mode to realize the FIFO data stream read mode to be arranged to the continuous data stream read mode.

Optionally, if the target code fragment includes the code fragment corresponding to the second time, the target code fragment modification module is specifically used for: determining whether the parameter configuration time of the contactless card is equal to or greater than the frame delay standard time, so the preset driver modification rule includes that if the target code fragment includes the code fragment corresponding to the second time, and the parameter configuration time of the contactless card is equal to or greater than the frame delay standard time, modifying the code fragment corresponding to the second time to remove the frame delay time; if the parameter configuration time of the contactless card is equal to or greater than the frame delay standard time, modifying the code fragment corresponding to the second time to remove the frame delay time.

Optionally, the target code fragment modification module is further configured to: if the parameter configuration time of the contactless card is less than the frame delay standard time, calculating the difference between the frame delay standard time and the parameter configuration time of the contactless card, and the second time is updated to the difference.

Optionally, the device for improving reading and writing speed of a contactless card includes a verification unit, and the verification unit is used for verifying whether the running time of the optimized driver complies with the running time standard of the preset driver.

The verification unit is specifically used for: obtaining a preset driver running time standard, and verifying whether the optimized driver running time complies with the preset driver running time standard.

In the embodiment of the present application, the communication signal between the driver and the interface chip is obtained by running the driver of the POS terminal, and the interface chip obtains the data to be read and written by the contactless card according to the communication signal, and the interface chip on which the card reader located interacts with the contactless card, and then obtains the timing waveform diagram of the driver according to the communication signal, obtains the running time of the driver according to the timing waveform diagram, and then obtains the running time according to the running time and preset driver modification rule, modify the driver to shorten the running time of the driver. Since the running time of the driver can be obtained according to the timing waveform diagram, the driver can be modified according to the running time and the preset driver modification rule to shorten the running time of the driver and improve the speed of the interface chip to read and write the contactless card. The speed of reading and writing the contactless card by the driver of the POS terminal is improved, so that when the transaction speed of the contactless card is authenticated under the non-real-time operating system platform, the transaction speed of the contactless card can meet the authentication requirements.

It should be understood that the size of the sequence numbers of the steps in the above embodiments does not mean the sequence of execution, and the execution sequence of each process should be determined by its functions and internal logic, and should not constitute any limitation to the implementation process of the embodiments of the present application.

Embodiment 3

Figure 4:
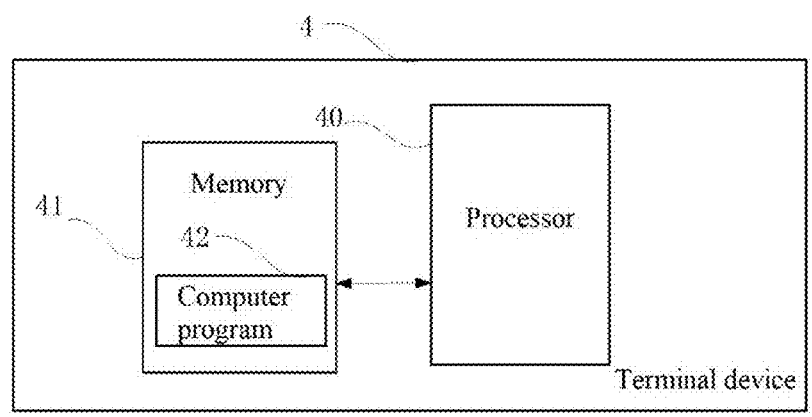
FIG. 4 is a schematic diagram of a terminal device provided by an embodiment of the present application.

FIG. 4 is a schematic diagram of a terminal device provided by an embodiment of the present application. As shown in FIG. 4, the terminal device 4 in this embodiment includes: a processor 40, a memory 41, and a computer program 42 stored in the memory 41 and running on the processor 40. When the processor 40 executes the computer program 42, the steps in the above embodiments of the method for improving the reading and writing speed of each contactless card are implemented, for example, steps S11 to S15 shown in FIG. 1. Alternatively, when the processor 40 executes the computer program 42, the functions of the units in the foregoing device embodiments, such as the functions of the units 31 to 35 shown in FIG. 3, are implemented.

Exemplarily, the computer program 42 may be divided into one or more modules/units, and the one or more modules/units are stored in the memory 41 and executed by the processor 40 to complete the present application. The one or more modules/units may be a series of computer program instruction segments capable of accomplishing specific functions, and the instruction segments are used to describe the execution process of the computer program 42 in the terminal device 4. For example, the computer program 42 can be divided into a driver running unit, a communication signal obtaining unit, a timing waveform diagram obtaining unit, a running time obtaining unit, a driver modifying unit, and the specific functions of each unit are as follows:

The driver running unit, used to run the driver of the POS terminal.

The communication signal obtaining unit is used to obtain the communication signal between the driver and the interface chip, the interface chip obtains the data to be read and written by the contactless card according to the communication signal, the card reader where the interface chip is located is connected to the contactless card is used to perform interaction of the data.

The timing waveform diagram obtaining unit is used for obtaining the timing waveform diagram of the driver according to the communication signal.

The running time obtaining unit is used to obtain the running time of the driver according to the timing waveform diagram.

The driver modifying unit is configured to modify the driver to shorten the running time of the driver according to the running time and the preset driver modification rule.

The terminal device 4 may be a computing device such as a desktop computer, a notebook, a palmtop computer, and a cloud server. The terminal device may include, but is not limited to, a processor 40 and a memory 41. Those skilled in the art can understand that FIG. 4 is only an example of the terminal device 4, and does not constitute a limitation on the terminal device 4. It may include more or less components than those shown in the figure, or combine some components, or different components, such as the terminal device may also include an input and output device, a network access device, a bus, and the like.

The so-called processor 40 may be a central processing unit (Central Processing Unit, CPU), and may also be other general-purpose processors, digital signal processors (Digital Signal Processor, DSP), application specific integrated circuits (Application Specific Integrated Circuit, ASIC), field programmable gates Field-Programmable Gate Array (FPGA) or other programmable logic devices, discrete gate or transistor logic devices, discrete hardware components, etc. The general-purpose processor may be a microprocessor or the processor may be any conventional processor or the like.

The memory 41 may be an internal storage unit of the terminal device 4, such as a hard disk or a memory of the terminal device 4. The memory 41 may also be an external storage device of the terminal device 4, such as a plug-in hard disk, a smart memory card (Smart Media Card, SMC), a secure digital (Secure Digital, SD) card, and a flash memory equipped on the terminal device 4. Card (Flash Card), etc. Further, the memory 41 may also include both an internal storage unit of the terminal device 4 and an external storage device. The memory 41 is used to store the computer program and other programs and data required by the terminal device. The memory 41 can also be used to temporarily store data that has been output or will be output.

Those skilled in the art can clearly understand that, for the convenience and simplicity of description, only the division of the above-mentioned functional units and modules is used as an example for illustration. In practical application program, the above-mentioned functions can be allocated to different functional units, module to complete. Dividing the internal structure of the device into different functional units or modules to complete all or part of the functions described above. Each functional unit and module in the embodiment may be integrated in one processing unit, or each unit may exist physically alone, or two or more units may be integrated into one unit, and the above-mentioned integrated units may adopt hardware. It can also be realized in the form of software functional units. In addition, the specific names of the functional units and modules are only for the convenience of distinguishing from each other, and are not used to limit the protection scope of the present application. For the specific working processes of the units and modules in the above-mentioned system, reference may be made to the corresponding processes in the foregoing method embodiments, which will not be repeated here.

In the foregoing embodiments, the description of each embodiment has its own emphasis. For parts that are not described or described in detail in a certain embodiment, reference may be made to the relevant descriptions of other embodiments.

Those of ordinary skill in the art can realize that the units and algorithm steps of each example described in conjunction with the embodiments disclosed herein can be implemented in electronic hardware, or a combination of computer software and electronic hardware. Whether these functions are performed in hardware or software depends on the specific application and design constraints of the technical solution. Skilled artisans may implement the described functionality using different methods for each particular application, but such implementations should not be considered beyond the scope of the present application.

In the embodiments provided by the present application, it should be understood that the disclosed apparatus/terminal device and method may be implemented in other manners. For example, the device/terminal device embodiments described above are only illustrative. For example, the division of the modules or units is only a logical function division. In actual implementation, there may be other division methods, such as multiple units. Or components may be combined or may be integrated into another system, or some features may be omitted, or not implemented. On the other hand, the shown or discussed mutual coupling or direct coupling or communication connection may be through some interfaces, indirect coupling or communication connection of devices or units, and may be in electrical, mechanical or other forms.

The units described as separate components may or may not be physically separated, and components displayed as units may or may not be physical units, that is, may be located in one place, or may be distributed to multiple network units. Some or all of the units may be selected according to actual needs to achieve the purpose of the solution in this embodiment.

In addition, each functional unit in each embodiment of the present application may be integrated into one processing unit, or each unit may exist physically alone, or two or more units may be integrated into one unit. The above-mentioned integrated units may be implemented in the form of hardware, or may be implemented in the form of software functional units.

The integrated modules/units, if implemented in the form of software functional units and sold or used as independent products, may be stored in a computer-readable storage medium. Based on this understanding, the present application realizes all or part of the processes in the methods of the above embodiments, and can also be completed by instructing the relevant hardware through a computer program. The computer program can be stored in a computer-readable storage medium. When the program is executed by the processor, the steps of the foregoing method embodiments can be implemented. Wherein, the computer program includes computer program code, and the computer program code may be in the form of source code, object code, executable file or some intermediate form, and the like. The computer-readable medium may include: any entity or device capable of carrying the computer program code, recording medium, U disk, mobile hard disk, magnetic disk, optical disk, computer memory, read-only memory (ROM, Read-Only Memory), Random Access Memory (RAM, Random Access Memory), electric carrier signal, telecommunication signal and software distribution medium, etc. It should be noted that the content contained in the computer-readable media may be appropriately increased or decreased according to the requirements of legislation and patent practice in the jurisdiction, for example, in some jurisdictions, according to legislation and patent practice, the computer-readable media Electric carrier signals and telecommunication signals are not included.

The above-mentioned embodiments are only used to illustrate the technical solutions of the present application, but not to limit them; although the present application has been described in detail with reference to the foregoing embodiments, those of ordinary skill in the art should understand that: it can still be used for the foregoing implementations. The technical solutions described in the examples are modified, or some technical features thereof are equivalently replaced; and these modifications or replacements do not make the essence of the corresponding technical solutions deviate from the spirit and scope of the technical solutions of the embodiments of the present application, and should be included in the within the protection scope of the present application.

What is claimed is:

1. A method for improving a reading and writing speed of a contactless card, being applied to a processor of a POS terminal, comprising: running a driver y the processor of the POS terminal; obtaining, by the processor, a communication signal between the driver and an interface chip of a card reade, obtaining, by the interface chip, data to be read and written of the contactless card according to the communication signal, and wherein data interaction is performed between a—the card reade and the contactless card; obtaining, by the processor, a timing waveform diagram of the driver according to the communication signal; obtaining, by the processor, a running time of the driver according to the timing waveform diagram; and modifying, by the processor, the driver to shorten the running time of the driver according to the running time and a preset driver modification rule;— wherein said modifying, by the processor, the driver to shorten the running time of the driver according to the running time and a preset driver modification rule comprises: determining, by the processor, a target code fragment according to the running time, wherein the target code fragment is a code fragment in the driver whose running time equals to or greater than a running time threshold of a preset code fragment; and modifying, by the processor, the target code fragment to shorten the running time of the driver according to the preset driver modification rule.

2. The method for improving the reading and writing speed of the contactless card of claim 1, wherein if the target code fragment comprises a wrong interruption code fragment, and the wrong interruption code fragment comprises a wrong interruption enable code fragment, said modifying of the target code fragment to shorten the running time of the driver according to the preset driver modification rule comprises: adjusting the wrong interruption enable code fragment to be after a data transmission setting code fragment according to the wrong interruption code fragment and the preset driver modification rule; wherein the preset driver modification rule comprises that if the target code fragment comprises the wrong interruption code fragment, and the wrong interruption code fragment comprises a wrong interruption enable code fragment, then the wrong interruption enable code fragment is adjusted to be after the data transmission setting code fragment.

3. The method for improving the reading and writing speed of the contactless card of claim 1, wherein said determining of the target code fragment according to the running time comprises: counting a first time, a second time, a third time, a fourth time, and a fifth time according to the running time, wherein the first time is a time used to call the driver, the second time is a frame delay time, and the third time is a sum of a time for configuring the interface chip and a time for writing the data to be sent to the contactless card into an interface chip cache, the fourth time is a time for completion of sending the data to the contactless card, and the fifth time is a time for receiving the data responded from the contactless card; determining the target code fragment according to the first time, the second time, the third time, the fourth time, the fifth time, and the preset code fragment running time threshold, wherein the preset code fragment running time threshold comprises: a preset first time threshold, a preset second time threshold, a preset third time threshold, a preset fourth time threshold, and a preset fifth time threshold.

4. The method for improving the reading and writing speed of the contactless card of claim 3, wherein if the target code fragment comprises a code fragment corresponding to the third time or/and a code fragment corresponding to the fifth time, said modifying of the target code fragment to shorten the running time of the driver according to the preset driver modification rule comprises: determining whether a FIFO data stream read mode is a continuous data stream read mode, wherein the preset driver modification rule comprises that if the mode for reading the FIFO data stream read mode is not the continuous data stream read mode, a set code fragment of the FIFO data stream read mode is modified to set the FIFO data stream read mode to be the continuous data stream read mode; and modifying a set code fragment of the FIFO data stream read mode to set FIFO data stream read mode to be the continuous data stream read mode, if the FIFO data stream read mode is not the continuous data stream read mode.

5. The method for improving the reading and writing speed of the contactless card of claim 3, wherein if the target code fragment comprises a code fragment corresponding to the second time, said modifying of the target code fragment to shorten the running time of the driver according to the preset driver modification rule comprises: determining whether a parameter configuration time of the contactless card equals to or greater than a frame delay standard time; wherein the preset driver modification rule comprises that if the target code fragment comprises the code fragment corresponding to the second time, and the parameter configuration time of the contactless card equals to or greater than the frame delay standard time, the code fragment is modified corresponding to the second time to remove the frame delay time; and modifying the code fragment corresponding to the second time to remove the frame delay time, if the parameter configuration time of the contactless card equals to or greater than the frame delay standard time.

6. The method for improving the reading and writing speed of the contactless card of claim 1, wherein the obtaining of the running time of the driver according to the timing waveform diagram comprises: obtaining an overall running time according to the timing waveform diagram; and obtaining a running time of the driver by removing a fixed necessary time from the overall running time, wherein the fixed necessary time comprises a carrier turn-on time, a card response delay time, and a terminal sending process time.

7. A terminal device, comprising: a memory, a processor, and a computer program, stored in the memory and running on the processor; wherein the processor is configured for realizing steps of the method of claim 1, when executing the computer program, wherein the method comprises: running a driver by the processor of the POS terminal; obtaining, by the processor, a communication signal between the driver and an interface chip of a card reade, obtaining, by the interface chip, data to be read and written of the contactless card according to the communication signal, and wherein data interaction is performed between a—the card reade and the contactless card; obtaining, by the processor, a timing waveform diagram of the driver according to the communication signal; obtaining, by the processor, a running time of the driver according to the timing waveform diagram; and modifying, by the processor, the driver to shorten the running time of the driver according to the running time and a preset driver modification rule;—wherein said modifying, by the processor, the driver to shorten the running time of the driver according to the running time and a preset driver modification rule comprises: determining, by the processor, a target code fragment according to the running time, wherein the target code fragment is a code fragment in the driver whose running time equals to or greater than a running time threshold of a preset code fragment; and modifying, by the processor, the target code fragment to shorten the running time of the driver according to the preset driver modification rule.

8. A non-transitory computer-readable storage medium, storing a computer program, which, when being executed by the processor, causes the processor to implement the steps of the method claim 1, wherein the method is applied to the processor and comprises: running a driver y the processor of the POS terminal; obtaining, by the processor, a communication signal between the driver and an interface chip of a card reade, obtaining, by the interface chip, data to be read and written of the contactless card according to the communication signal, and wherein data interaction is performed between a—the card read and the contactless card; obtaining, by the processor, a timing waveform diagram of the driver according to the communication signal; obtaining, by the processor, a running time of the driver according to the timing waveform diagram; and modifying, by the processor, the driver to shorten the running time of the driver according to the running time and a preset driver modification rule; wherein said modifying, by the processor, the driver to shorten the running time of the driver according to the running time and a preset driver modification rule comprises: determining, by the processor, a target code fragment according to the running time, wherein the target code fragment is a code fragment in the driver whose running time equals to or greater than a running time threshold of a preset code fragment; and modifying, by the processor, the target code fragment to shorten the running time of the driver according to the preset driver modification rule.

9. The terminal device of claim 8, wherein if the target code fragment comprises a wrong interruption code fragment, and the wrong interruption code fragment comprises a wrong interruption enable code fragment, said modifying of the target code fragment to shorten the running time of the driver according to the preset driver modification rule comprises: adjusting the wrong interruption enable code fragment to be after a data transmission setting code fragment according to the wrong interruption code fragment and the preset driver modification rule; wherein the preset driver modification rule comprises that if the target code fragment comprises the wrong interruption code fragment, and the wrong interruption code fragment comprises a wrong interruption enable code fragment, then the wrong interruption enable code fragment is adjusted to be after the data transmission setting code fragment.

10. The terminal device of claim 8, wherein said determining of the target code fragment according to the running time comprises: counting a first time, a second time, a third time, a fourth time, and a fifth time according to the running time, wherein the first time is a time used to call the driver, the second time is a frame delay time, and the third time is a sum of a time for configuring the interface chip and a time for writing the data to be sent to the contactless card into an interface chip cache, the fourth time is a time for completion of sending the data to the contactless card, and the fifth time is a time for receiving the data responded from the contactless card; determining the target code fragment according to the first time, the second time, the third time, the fourth time, the fifth time, and the preset code fragment running time threshold, wherein the preset code fragment running time threshold comprises: a preset first time threshold, a preset second time threshold, a preset third time threshold, a preset fourth time threshold, and a preset fifth time threshold.

11. The terminal device of claim 10, wherein if the target code fragment comprises a code fragment corresponding to the third time or/and a code fragment corresponding to the fifth time, said modifying of the target code fragment to shorten the running time of the driver according to the preset driver modification rule comprises: determining whether a FIFO data stream read mode is a continuous data stream read mode, wherein the preset driver modification rule comprises that if the mode for reading the FIFO data stream read mode is not the continuous data stream read mode, a set code fragment of the FIFO data stream read mode is modified to set the FIFO data stream read mode to be the continuous data stream read mode; and modifying a set code fragment of the FIFO data stream read mode to set FIFO data stream read mode to be the continuous data stream read mode, if the FIFO data stream read mode is not the continuous data stream read mode.

12. The terminal device of claim 10, wherein if the target code fragment comprises a code fragment corresponding to the second time, said modifying of the target code fragment to shorten the running time of the driver according to the preset driver modification rule comprises: determining whether a parameter configuration time of the contactless card equals to or greater than a frame delay standard time; wherein the preset driver modification rule comprises that if the target code fragment comprises the code fragment corresponding to the second time, and the parameter configuration time of the contactless card equals to or greater than the frame delay standard time, the code fragment is modified corresponding to the second time to remove the frame delay time; and modifying the code fragment corresponding to the second time to remove the frame delay time, if the parameter configuration time of the contactless card equals to or greater than the frame delay standard time.

13. The terminal device of claim 7, wherein the obtaining of the running time of the driver according to the timing waveform diagram comprises: obtaining an overall running time according to the timing waveform diagram; and obtaining a running time of the driver by removing a fixed necessary time from the overall running time, wherein the fixed necessary time comprises a carrier turn-on time, a card response delay time, and a terminal sending process time.

14. The non-transitory computer-readable storage medium of claim 8, wherein if the target code fragment comprises a wrong interruption code fragment, and the wrong interruption code fragment comprises a wrong interruption enable code fragment, said modifying the target code fragment to shorten the running time of the driver according to the preset driver modification rule comprises: adjusting the wrong interruption enable code fragment to be after a data transmission setting code fragment according to the wrong interruption code fragment and the preset driver modification rule; wherein the preset driver modification rule comprises that if the target code fragment comprises the wrong interruption code fragment, and the wrong interruption code fragment comprises a wrong interruption enable code fragment, then the wrong interruption enable code fragment is adjusted to be after the data transmission setting code fragment.

15. The non-transitory computer-readable storage medium of claim 8, wherein said determining a target code fragment according to the running time comprises: counting a first time, a second time, a third time, a fourth time, and a fifth time according to the running time, wherein the first time is a time used to call the driver, the second time is a frame delay time, and the third time is a sum of a time for configuring the interface chip and a time for writing the data to be sent to the contactless card into an interface chip cache, the fourth time is a time for completion of sending the data to the contactless card, and the fifth time is a time for receiving the data responded from the contactless card; determining the target code fragment according to the first time, the second time, the third time, the fourth time, the fifth time, and the preset code fragment running time threshold, wherein the preset code fragment running time threshold comprises: a preset first time threshold, a preset second time threshold, a preset third time threshold, a preset fourth time threshold, and a preset fifth time threshold.

16. The non-transitory computer-readable storage medium of claim 15, wherein if the target code fragment comprises a code fragment corresponding to the third time or/and a code fragment corresponding to the fifth time, said modifying the target code fragment to shorten the running time of the driver according to the preset driver modification rule comprises: determining whether a FIFO data stream read mode is a continuous data stream read mode, wherein the preset driver modification rule comprises that if the mode for reading the FIFO data stream read mode is not the continuous data stream read mode, a set code fragment of the FIFO data stream read mode is modified to set the FIFO data stream read mode to be the continuous data stream read mode; and modifying a set code fragment of the FIFO data stream read mode to set FIFO data stream read mode to be the continuous data stream read mode, if the FIFO data stream read mode is not the continuous data stream read mode.

\* \* \* \* \*